(12) United States Patent
Salter et al.

(10) Patent No.: US 9,925,917 B2
(45) Date of Patent: Mar. 27, 2018

(54) CONCEALED LIGHTING FOR VEHICLES

(71) Applicant: Ford Global Technologies, LLC, Dearborn, MI (US)

(72) Inventors: Stuart C. Salter, White Lake, MI (US); Paul Kenneth Dellock, Northville, MI (US); Christopher Charles Hunt, Livonia, MI (US); Chad Hoover, Washington, MI (US); Doug H. Randlett, Metamora, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 135 days.

(21) Appl. No.: 15/165,465

(22) Filed: May 26, 2016

(65) Prior Publication Data

US 2017/0341571 A1 Nov. 30, 2017

(51) Int. Cl.
*B60Q 1/00* (2006.01)
*B60Q 1/26* (2006.01)
*B60Q 1/52* (2006.01)
*B60Q 1/32* (2006.01)

(52) U.S. Cl.
CPC ............. *B60Q 1/52* (2013.01); *B60Q 1/2619* (2013.01); *B60Q 1/323* (2013.01)

(58) Field of Classification Search
CPC .. B60Q 1/2619; B60Q 1/2653; B60Q 1/2696; B60Q 1/32; B60Q 1/323; B60Q 1/50; B60Q 1/503; B60Q 1/52
USPC .......................... 362/487, 496, 540, 543–549
See application file for complete search history.

(56) References Cited

U.S. PATENT DOCUMENTS

| | | | |
|---|---|---|---|
| 2,486,859 A | 11/1949 | Meijer et al. |
| 5,053,930 A | 10/1991 | Benavides |
| 5,434,013 A | 7/1995 | Fernandez |
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |

(Continued)

FOREIGN PATENT DOCUMENTS

| CN | 101337492 A | 1/2009 |
|---|---|---|
| CN | 201169230 Y | 2/2009 |

(Continued)

OTHER PUBLICATIONS

Claudius, Blink-Blink Car in Jakarta, A Really Creative Campaign of the New Yaris, Autonet, Feb. 14, 2014.

(Continued)

*Primary Examiner* — Jason Moon Han
(74) *Attorney, Agent, or Firm* — Jason Rogers; Price Heneveld LLP

(57) ABSTRACT

A vehicle illumination apparatus is disclosed. The apparatus comprises an emitting layer comprising a plurality of printed light sources and configured to conform to an outer surface of a panel. The apparatus further comprises a reflective layer disposed on an interior surface of the emitting layer and a surface layer configured to seal an outer surface of the apparatus. A controller is configured to selectively activate the light sources to reveal a symbol defined by the emitting layer.

20 Claims, 5 Drawing Sheets

(56) References Cited

U.S. PATENT DOCUMENTS

| | | |
|---|---|---|
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,330,102 B2 | 2/2008 | Fletcher |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,568,659 B2 | 2/2017 | Verger et al. |
| 9,616,812 B2 | 4/2017 | Sawayanagi |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0123359 A1 | 5/2008 | Larochelle |
| 2009/0213586 A1 | 8/2009 | Peng |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2017/0158125 A1 | 6/2017 | Schuett et al. |

FOREIGN PATENT DOCUMENTS

| | | |
|---|---|---|
| CN | 201193011 Y | 2/2009 |
| CN | 201712528 U | 1/2011 |
| CN | 202463726 U | 10/2012 |
| CN | 203573613 U | 4/2014 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2317494 A1 | 5/2011 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

OTHER PUBLICATIONS

SKODA ShadeChange Technology Brings a New World of Colour to Fabia Owners, SKODA Auto, Jan. 4, 2015.

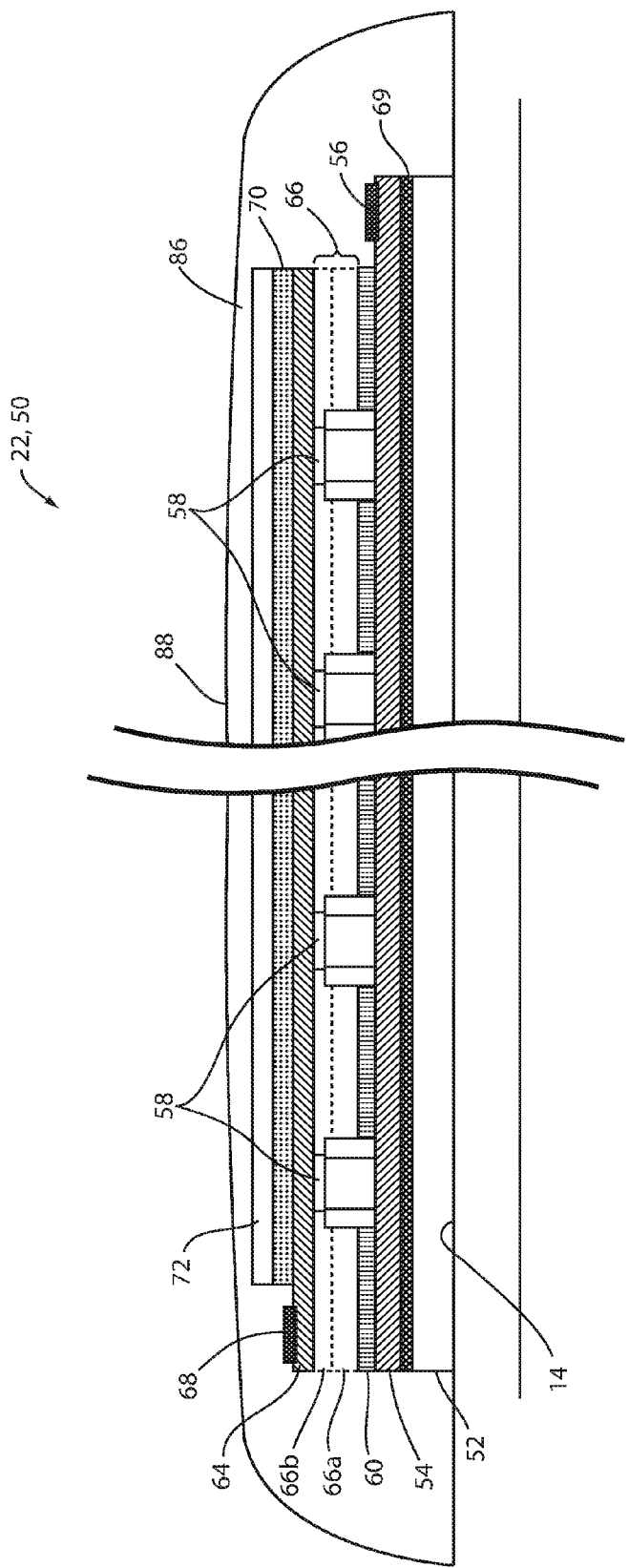

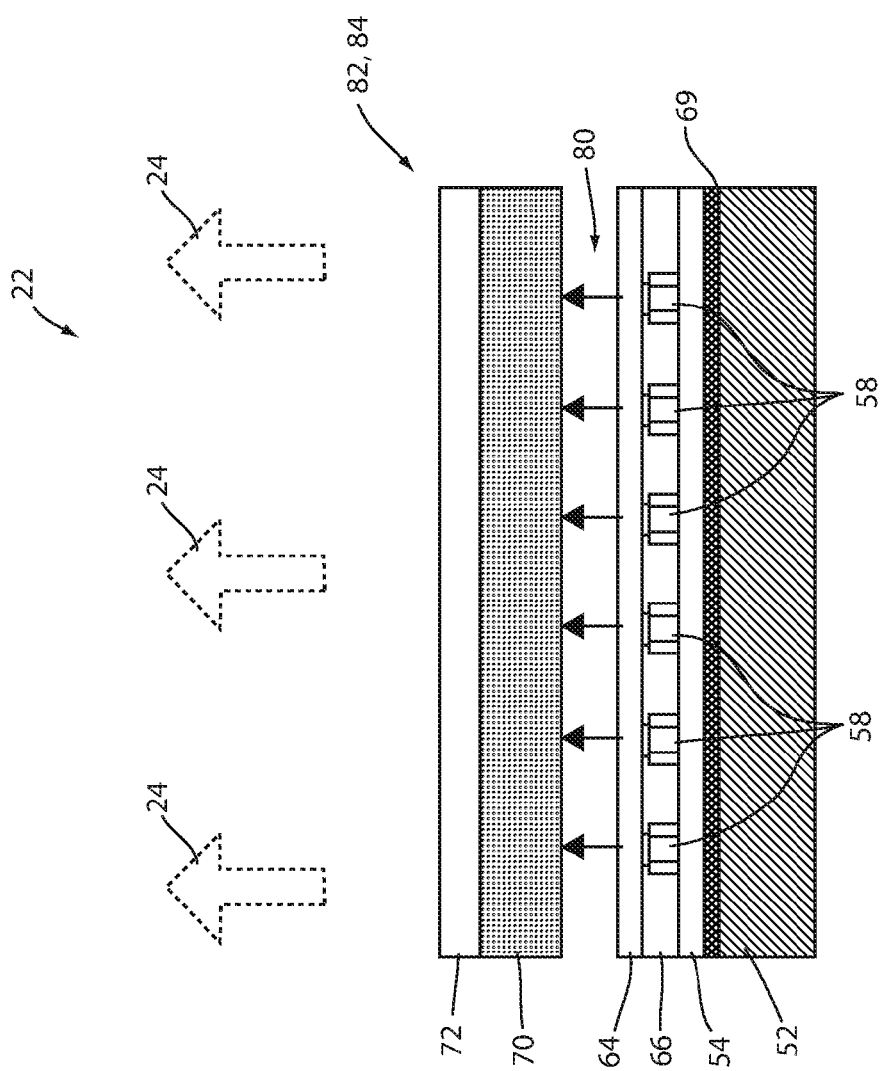

CONCEALED LIGHTING FOR VEHICLES

FIELD OF THE INVENTION

The present disclosure generally relates to a vehicle lighting apparatus, and more particularly, to a concealed lighting apparatus for a vehicle.

BACKGROUND OF THE INVENTION

Providing lighting for emergency vehicles may be implemented to provide various warnings and/or indications that an emergency vehicle is approaching. The disclosure provides for various embodiments of lighting systems that may improve safety, visibility, aesthetics, and/or features of the lighting for the emergency vehicles.

SUMMARY OF THE INVENTION

According to one aspect of the present disclosure, a vehicle illumination apparatus is disclosed. The apparatus comprises an emitting layer comprising a plurality of printed light sources and configured to conform to an outer surface of a panel. The apparatus further comprises a reflective layer disposed on an interior surface of the emitting layer and a surface layer configured to seal an outer surface of the apparatus. A controller is configured to selectively activate the light sources to reveal a symbol defined by the emitting layer.

According to another aspect of the present disclosure, a vehicle illumination apparatus is disclosed. The apparatus comprises an emitting layer comprising a plurality of printed light sources and configured to conform to an outer surface of a panel. The apparatus further comprises a reflective layer disposed on an interior surface of the emitting layer and an overmolded layer configured to seal the emitting layer. A controller configured to selectively activate the light sources to reveal a symbol defined by the emitting layer.

According to yet another aspect of the present disclosure, a light emitting layer for a vehicle is disclosed. The emitting layer comprises a reflective layer forming an interior surface configured to conform to an outer surface of the vehicle. The emitting layer further comprises a plurality of printed light sources substantially coating the reflective layer and an etched silicon layer. The etched silicon layer is overmolded on an exterior surface of the emitting layer and abuts a panel having a painted surface. The silicon layer is configured to significantly match an appearance of the painted surface.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 2 is a detailed side view of a light producing assembly;

FIG. 3 is a side schematic view of a light producing assembly demonstrating a photoluminescent layer configured to convert a wavelength of light;

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1A:
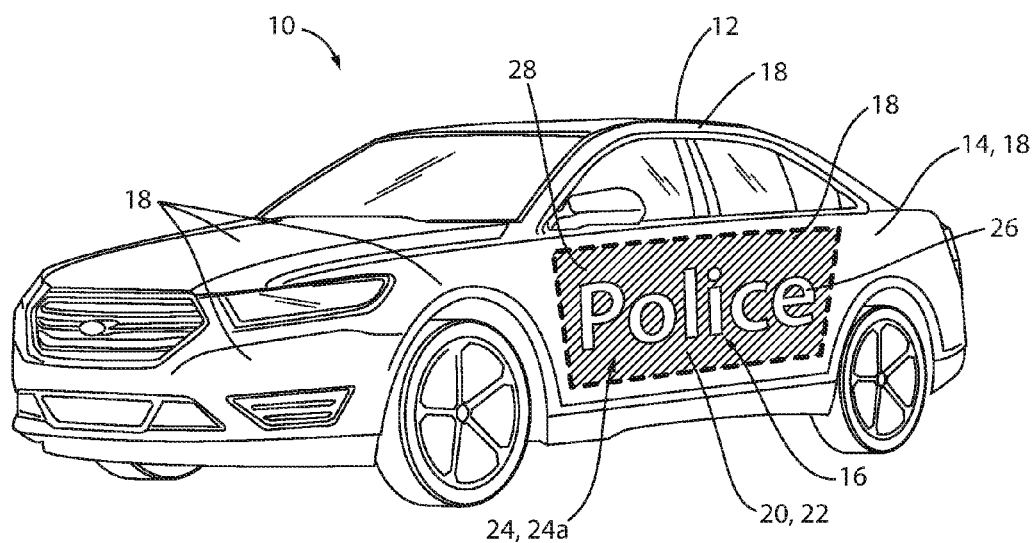
FIG. 1A is a front perspective view of an automotive vehicle demonstrating a illumination apparatus.
Figure 1B:
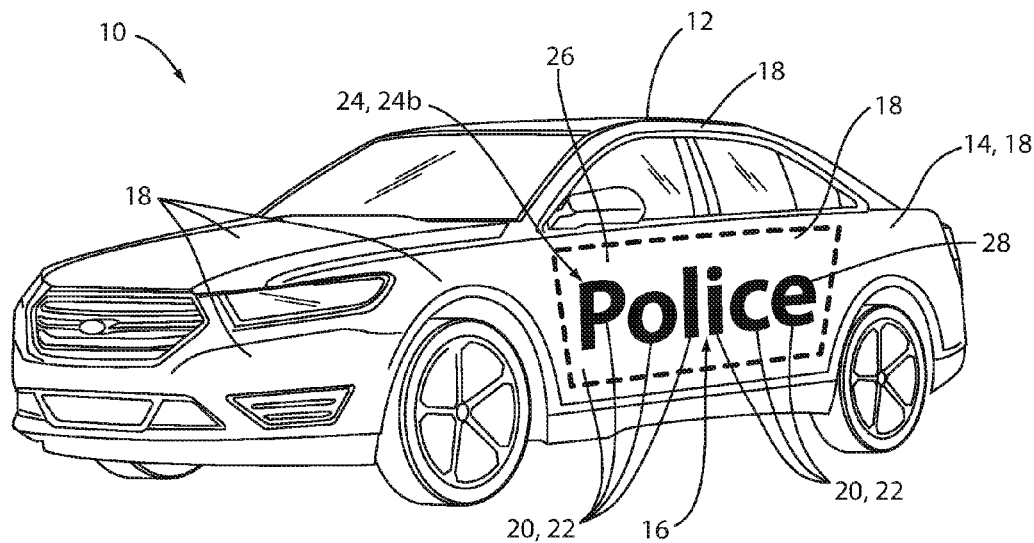
FIG. 1B is a front perspective view of an automotive vehicle demonstrating a illumination apparatus.

Referring to FIGS. 1A and 1B, the disclosure describes an illumination apparatus 10 for a vehicle 12. The vehicle 12 may correspond to an emergency vehicle, first response vehicle, and/or any vehicle that may utilize auxiliary lights. In some embodiments the illumination apparatus may correspond to a concealed lighting apparatus configured to conform to an outer surface or exterior surface 14 of the vehicle 12. As demonstrated in the exemplary embodiments of the application, the illumination apparatus 10 may be utilized to generate emissions of light in a variety of colors and may be utilized in various combinations to provide effective lighting for the vehicle 12. In some embodiments, the illumination apparatus 10 may correspond to an identifier 16 for a stealth or undercover law enforcement vehicle. Accordingly, the illumination apparatus 10 may be configured to selectively identify the vehicle 12 as a law enforcement vehicle in some operating modes and obscure the illumination apparatus 10 from view in other operating modes. Additional views of operating modes of the vehicle 12 or lighting configurations of the of the illumination apparatus 10 are discussed in reference to FIGS. 4A, 4B, 4C, and 4D.

In an exemplary embodiment, the illumination apparatus 10 may correspond to a substantially thin lighting assembly configured to be mounted to the exterior surface 14 of the vehicle 12. The exterior surface 14 may significantly align with a class-A surface of the vehicle 12. In this configuration, the illumination apparatus 10 may be configured to be mounted on the surface 14 without a conventional housing and also without a corresponding opening formed in at least one panel 18 of the vehicle 12. In some embodiments, the illumination apparatus 10 may be configured to be applied to one or more surfaces of the vehicle 12 that are substantially flush with class-A surfaces of the vehicle 12. Though specific examples are provided herein, the illumination apparatus 10 may be implemented in various interior and/or exterior panels of the vehicle 12 and may generally be configured to illuminate portions of the vehicle 12.

As referred to herein, a class-A surface of the vehicle 12 may correspond to an exposed surface that may typically be finished or painted. For example, a class-A surface may correspond to an exterior surface of any panel of the vehicle 12, which may be accessible to an onlooker of the vehicle 12. A class-A surface may conversely not ordinarily apply to an unfinished surface of the vehicle 12 configured to accommodate a housing or other features that may not be visible in an assembled configuration. Though discussed in reference to a class-A surface or finished surface, the illumination apparatus 10 and the various corresponding light producing assemblies 22 described herein may be utilized in connection with various surfaces of the vehicle 12.

In some embodiments, the illumination apparatus 10 may comprise a plurality of lighting portions 20, which may be selectively illuminated. Each of the plurality of lighting portions 20 may correspond to a light producing assembly 22. Each of the light producing assemblies 22 discussed herein may be configured to illuminate independently and may be configured to emit various colors of light. Accordingly, exemplary embodiments of the illumination apparatus 10 are discussed in detail in the following description. For purposes of this disclosure, a vehicle fixture or panel 18 may refer to any interior or exterior piece of vehicle equipment, or a part thereof, suitable for receiving the illumination apparatus 10 as described herein. While the embodiments of the illumination apparatus 10 described herein are primarily directed to automotive vehicle use, it should be appreciated that the apparatus or system may also be implemented in other types of vehicles designed to transport one or more passengers such as, but not limited to, watercraft, aircraft, trains, mass transit, etc.

In some embodiments, the illumination apparatus 10 may comprise a controller configured to selectively illuminate each of a plurality of light producing assemblies 22 in response to one or more signals received from one or more sensors, vehicle modules, and/or inputs. For example, in some embodiments, the controller 102 may be configured to selectively activate the one or more of the light producing assemblies 22 (e.g. the identifier 16) to produce an output emission 24 of light in response to an input from an emergency lighting system of the vehicle 12. The output emission 24 is denoted as the filled or patterned portions of the illumination apparatus shown in FIGS. 1A and 1B demonstrating the illumination from each of the lighting portions 20, respectively.

As demonstrated in FIGS. 1A and 1B, the illumination apparatus 10 may be selectively activated by the controller in communication with an emergency lighting system 120 to illuminate the identifier 16. The identifier 16 may be in the form of one or more symbols or designs. In some embodiments, the identifier may correspond to one or more symbols or text configured to communicate that the vehicle 12 corresponds to a law enforcement vehicle. The controller of the illumination apparatus 10 is discussed further in reference to FIG. 5.

Still Referring to FIGS. 1A and 1B, the illumination apparatus 10 is shown in a first configuration 24a and a second configuration 24b, respectively. In the first configuration 24a, the identifier 16 may be illuminated in a negative configuration, wherein the exterior surface 14 of the panel 18 may be illuminated to outline the negative or inverse of one or more symbols or designs of the identifier 16. In this configuration, the identifier may be identified as an unlit portion 26 of the illumination apparatus 10. In the second configuration 24b, an illuminated portion 28 of the identifier 16 may be illuminated. Accordingly, the illumination apparatus 10 may be configured to selectively illuminate one or more symbols or designs to reveal the identifier 16.

As further discussed herein, the illumination apparatus 10 may comprise one or more surface layers configured to conceal the light producing assemblies 22. In this configuration, the illumination apparatus 10 may be selectively revealed to provide one or more functions, for example illumination an area proximate a particular light producing assembly and/or communicating the symbol or design of the identifier 16. Additionally, each of the light producing assemblies 22 may be configured to emit light in a first color or a second color together or in various sequences or patterns. In this way, the illumination apparatus 10 may provide for a flexible lighting solution that may be configured to suit various applications.

Referring to FIG. 2, the light producing assembly 22 may correspond to a thin-film or printed light emitting diode (LED) assembly. The light producing assembly 22 may comprise a circuit 50 having a substrate 52. The substrate 52 may be opaque, transparent, or semi-transparent and may be thin. The light producing assembly 22 may be utilized in a variety of applications, which may have a thin overall thickness. The substrate 52 may be of a polymer, for example polycarbonate, poly-methyl methacrylate (PMMA), polyethylene terephthalate (PET), etc. In some embodiments, the substrate 52 may be dispensed from a roll to provide for integration into assembly operations for the light producing assembly 22 and may be approximately 0.1 mm to 1.5 mm thick.

A first electrode 54 or conductive layer may be disposed on the substrate 52. The first electrode 54 and/or various electrodes or conductive layers discussed herein may comprise a conductive epoxy, such as a silver-containing or copper-containing epoxy. The first electrode 54 may be conductively connected to a first bus bar 56. The first bus bar 56 and other bus bars or conduits discussed herein may be of metallic and/or conductive materials, which may be screen printed on the electrodes or conductive layers. The bus bars 56,68 may be utilized in the light producing assembly 22 to conductively connect a plurality of light-emitting diode (LED) sources 58 to a power source via the controller. In this way, the first bus bar 56, and other bus bars utilized in the light producing assembly, may be configured to uniformly deliver current along and/or across a surface of the light producing assembly 22.

The LED sources 58 may be printed, dispersed or otherwise applied to the first electrode 54 via a semiconductor ink 60. The semiconductor ink 60 may correspond to a liquid suspension comprising a concentration of LED sources 58 dispersed therein. The concentration of the LED sources 58 may vary based on a desired emission intensity of the light producing assembly 22. The LED sources 58 may be dispersed in a random or controlled fashion within the semiconductor ink 60. The LED sources 58 may correspond to micro-LEDs of gallium nitride elements, which may be approximately 5 microns to 400 microns across a width substantially aligned with the surface of the first electrode 54. The semiconductor ink 60 may include various binding and dielectric materials including but not limited to one or more of gallium, indium, silicon carbide, phosphorous and/or translucent polymeric binders. In this configuration, the semiconductor ink 60 may contain various concentrations of LED sources 58 such that a surface density of the LED sources 58 may be adjusted for various applications.

In some embodiments, the LED sources 58 and semiconductor ink 60 may be sourced from Nth Degree Technologies Worldwide Inc. The semiconductor ink 60 can be applied through various printing processes, including ink jet and silk screen processes to selected portion(s) of the substrate 52. More specifically, it is envisioned that the LED sources 58 may be dispersed within the semiconductor ink 60, and shaped and sized such that a substantial quantity of them preferentially align with the first electrode 54 and a second electrode 64 during deposition of the semiconductor ink 60. The portion of the LED sources 58 that ultimately are electrically connected to the electrodes 54, 64 may be illuminated by a voltage source applied across the first electrode 54 and the second electrode 64. In some embodiments, a power source derived from a vehicular power source may be employed as a power source to supply current to the LED sources 58. Additional information regarding the construction of a light producing assembly similar to the light producing assembly 22 is disclosed in U.S. Pat. No. 9,299,887 to Lowenthal et al., entitled "ULTRA-THIN PRINTED LED LAYER REMOVED FROM SUBSTRATE," filed Mar. 12, 2014, the entire disclosure of which is incorporated herein by reference.

At least one dielectric layer 66 may be printed over the LED sources 58 to encapsulate and/or secure the LED sources 58 in position. The at least one dielectric layer 66 may correspond to a first dielectric layer 66a and a second dielectric layer 66b, which may be of a substantially transparent material. The second electrode 64 may correspond to a top transparent conductive layer printed over the dielectric layer 66 to electrically connect the electrodes 54, 64. The second electrode 64 may be conductively connected to a second bus bar 68. The bus bars 56, 68 may be utilized in the light producing assembly 22 to conductively connect a plurality of LED sources 58 to the power source via the controller. Though the plurality of LED sources 58 are discussed as connected to the controller via the bus bars 56, 68, in some embodiments, the controller may supply current to the LED sources 58 via various forms of conductive leads or traces configured to conductively connect the controller to the first electrode 54 and the second electrode 64. An exemplary embodiment of the controller is discussed in reference to FIG. 5.

In some embodiments, the first electrode 54 and the second electrode 64 may correspond to an anode electrode and a cathode electrode. Though described as an anode and a cathode of the light producing assembly 22, the first electrode 54 and the second electrode 64 may be arranged such that the second electrode 64 (cathode) is disposed on the substrate and the first electrode 54 (anode) is disposed on the at least one dielectric layer 66. Additionally, a reflective layer 69 which may be of a metallic reflective material may be disposed between the substrate 52 and the first electrode 54 to reflect light emitted from the cathode outward from the substrate 52 through the second electrode 64. The bus bars 56, 68 may be printed along opposite edges of the electrodes 54, 64 and electrically terminate at anode and cathode terminals. Points of connection between the bus bars 56, 68 and the power source may be at opposite corners of each bus bar 56, 68 for uniform current distribution along each bus.

In some embodiments, the reflective layer 69 may correspond to a layer of white ink disposed between the first electrode 54 and the substrate. The white ink may correspond to a reflective ink configured to reflect the output emission 24 from one or more of the light producing assemblies 22 (e.g. the identifier 16). The white ink may be applied to the first electrode 54 via a screen printing, roll to roll or inkjet process. Accordingly, the white ink may correspond to a titanium dioxide ($TiO_2$) material with a high refractive index configured to provide a highly reflective surface. For most efficient light scattering, the $TiO_2$ pigment diameter should be slightly less than one-half the wavelength of light to be scattered. Titanium dioxide derived from rutile may be utilized due to a high refraction index of approximately 2.73 for white pigments that are affordable. Additionally, the titanium dioxide derived from rutile may be added to most inks or paints. Since the human eye is most sensitive to yellow-green light (wavelength about 0.55 microns), the theoretical optimum particle size for $TiO_2$ pigments for coatings may be approximately between 0.2 and 0.3 microns in diameter.

In some embodiments, the reflective layer 69 may correspond to a vacuum metalized coating applied to the first electrode 54. In such configurations, the metalized coating may be configured to reflect the output emission 24 outward from the illumination apparatus 10. The vacuum metalized coating may correspond to a silver, nickel or aluminum material configured to provide a highly reflective surface. For example, the vacuum metalized coating may correspond to an aluminum material. The reflective layer 69 may further be coated with one or more adhesives on a surface directed toward the substrate 52. In this configuration, the illumination apparatus 10 may be adhered to the substrate 52 for ease of assembly on the panel 18 of the vehicle 12.

Still referring to FIG. 2, in some embodiments, a photoluminescent layer 70 may be applied to the second electrode 64 to form a backlit configuration of the light producing assembly 22. In some embodiments, the photoluminescent layer 70 may alternatively or additionally be configured in a front-lit configuration. The photoluminescent layer 70 may be applied as a coating, layer, film, and/or photoluminescent substrate 52 to the second electrode 64 or any surface of the light producing assembly 22 configured to emit the output emission 24 therethrough. The photoluminescent layer 70 may be applied by screen printing, flexography, and/or otherwise affixed to the second electrode 64 or a portion of a fixture or panel 18 of the vehicle 12.

In various implementations, the LED sources 58 may be configured to emit an excitation emission comprising a first wavelength corresponding to blue light. The LED sources 58 may be configured to emit the excitation emission into the photoluminescent layer 70 such that the photoluminescent material becomes excited. In response to the receipt of the excitation emission, the photoluminescent material converts the excitation emission from the first wavelength to the output emission 24 comprising at least a second wavelength longer than the first wavelength. Additionally, one or more coatings 72 or sealing layers may be applied to an exterior surface of the light producing assembly 22 to protect the photoluminescent layer 70 and various other portions of the light producing assembly 22 from damage and wear.

Referring now to FIG. 3, a detailed view of photoluminescent layer 70 of the light producing assembly 22 is shown. The light producing assembly 22 is configured similar to the light producing assembly 22 demonstrated in FIG. 2, with like-numbered elements having the same or comparable function and structure. Though not shown in FIG. 3, the LED sources 58 may be in electrical communication with the bus bars 56, 68 and a power source via the controller such that the controller may selectively activate an excitation emission 80 from LED sources 58.

In an exemplary implementation, the excitation emission 80 may comprise a first wavelength corresponding to a blue, violet, and/or ultra-violet spectral color range. The blue spectral color range comprises a range of wavelengths generally expressed as blue light (~440-500 nm). In some implementations, the first wavelength may comprise a wavelength in the ultraviolet and near ultraviolet color range (~100-450 nm). In an exemplary implementation, the first wavelength may be approximately equal to 470 nm. Though particular wavelengths and ranges of wavelengths are discussed in reference to the first wavelength, the first wavelength may generally be configured to excite any photoluminescent material.

In operation, the excitation emission 80 is transmitted into an at least partially light transmissive material of the photoluminescent layer 70. The excitation emission 80 is emitted from the LED sources 58 and may be configured such that the first wavelength corresponds to at least one absorption wavelength of one or more photoluminescent materials disposed in the photoluminescent layer 70. For example, the photoluminescent layer 70 may comprise an energy conversion layer 82 configured to convert the excitation emission 80 at the first wavelength to an output emission 24 having a second wavelength, different from the first wavelength. The output emission 24 may comprise one or more wavelengths, one of which may be longer than the first wavelength. The conversion of the excitation emission 80 to the output emission 24 by the energy conversion layer 82 is referred to as a Stokes shift.

In some embodiments, the output emission 24 may correspond to a plurality of wavelengths. Each of the plurality of wavelengths may correspond to significantly different spectral color ranges. For example, the at least second wavelength of the output emission 24 may correspond to a plurality of wavelengths (e.g. second, third, etc.). In some implementations, the plurality of wavelengths may be combined in the output emission 24 to appear as substantially white light. The plurality of wavelengths may be generated by a red-emitting photoluminescent material having a wavelength of approximately 620-750 nm, a green emitting photoluminescent material having a wavelength of approximately 526-606 nm, and a blue or blue green emitting photoluminescent material having a wavelength longer than the first wavelength $\lambda_1$ and approximately 430-525 nm. In some implementations, a blue or blue green wavelength may correspond to the excitation emission 80 being combined with the output emission 24. As discussed herein, a concentration of the photoluminescent material may be configured to allow at least a portion of the excitation emission 80 to be emitted with the output emission 24 to add a blue hue to the output emission 24. The plurality of wavelengths may be utilized to generate a wide variety of colors of light from the each of the photoluminescent portions converted from the first wavelength. Though the particular colors of red, green, and blue are referred to herein, various photoluminescent materials may be utilized to generate a wide variety of colors and combinations to control the appearance of the output emission 24.

The photoluminescent materials, corresponding to the photoluminescent layer 70 or the energy conversion layer 82, may comprise organic or inorganic fluorescent dyes configured to convert the excitation emission 80 to the output emission 24. For example, the photoluminescent layer 70 may comprise a photoluminescent structure of rylenes, xanthenes, porphyrins, phthalocyanines, or other materials suited to a particular Stokes shift defined by an absorption range and an emission fluorescence. In some embodiments, the photoluminescent layer 70 may be of at least one inorganic luminescent material selected from the group of phosphors. The inorganic luminescent material may more particularly be from the group of Ce-doped garnets, such as YAG:Ce. As such, each of the photoluminescent portions may be selectively activated by a wide range of wavelengths received from the excitation emission 80 configured to excite one or more photoluminescent materials to emit an output emission 24 having a desired color.

Still referring to FIG. 3, the light producing assembly 22 may further include the coating 72 as at least one stability layer configured to protect the photoluminescent material contained within the energy conversion layer 82 from photolytic and/or thermal degradation. The stability layer may be configured as a separate layer optically coupled and adhered to the energy conversion layer 82. The stability layer may also be integrated with the energy conversion layer 82. The photoluminescent layer 70 and/or the one or more coatings 72 may also include a protection layer optically coupled and adhered to the stability layer or any layer or coating to protect the photoluminescent layer 70 from physical and chemical damage arising from environmental exposure.

The stability layer and/or the protection layer may be combined with the energy conversion layer 82 to form an integrated photoluminescent structure 84 through sequential coating or printing of each layer, or by sequential lamination or embossing. Additionally, several layers may be combined by sequential coating, lamination, or embossing to form a substructure. The substructure may then be laminated or embossed to form the integrated photoluminescent structure 84. Once formed, the photoluminescent structure may be applied to a surface of at least one of the electrodes 54, 64 such that the excitation emission 80 received from the LED sources 58 may be converted to the output emission 24. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference.

Referring again to FIG. 2, in some embodiments, the illumination apparatus 10 may further comprise a surface layer 86 configured to seal the illumination apparatus 10. The surface layer may correspond to a film layer and/or an overmolded layer. The surface layer 86 may correspond to various materials such as optical grade silicone, polycarbonate, epoxy or urethane. In an exemplary embodiment, the surface layer may correspond to an overmolded silicon layer configured to seal the photoluminescent layer 70 as well as various other layers of the light producing assembly 22 from the damage, which may be related to an operating environment of the vehicle 12.

The surface layer 86 may comprise one or more additives or intermediate layers that may provide for improved operation of the illumination apparatus 10. For example, the surface layer 86 may comprise one or more materials configured to inhibit the transmission of ultraviolet (UV) light therethrough. Some examples of UV inhibitors that may be integrated into the surface layer 86 may include the following: hindered amines (HALS) or other UV absorbers including oxanilides for polyamides, benzophenones for PVC, and benzotriazoles and hydroxyphenyltriazines for polycarbonate. The UV inhibitors may be configured to block UV light from environmental light sources impinging upon the surface layer 86 from activating the photoluminescent layer 70.

In some embodiments, the illumination apparatus 10 may comprise a dye or color configured to provide for a matching appearance of the exterior surface 14 of the panel 18. Such dyes or color additives may correspond to titanium dioxide if a white paint is being matched. In this way, an emitting surface 88 of the surface layer 86 may be configured to match a color of the exterior surface such that the illumination apparatus 10 may be concealed. In some embodiments, the emitting surface 88 may further comprise a textured or grained surface. The grained surface may be produced by laser etching the surface layer 86 and may provide for the emitting surface 88 to match the appearance of the exterior surface 14.

Referring now to FIGS. 4A, 4B, 4C, and 4D, a front perspective view of the vehicle 12 is shown demonstrating various lighting configurations of the illumination apparatus 10. In the first configuration 24*a*, the identifier 16 may be illuminated in a negative configuration, wherein the exterior surface 14 of the panel 18 may be illuminated to outline the negative or inverse of one or more symbols or designs of the identifier 16. In this configuration, the identifier may be identified as an unlit portion 26 of the illumination apparatus 10. In the second configuration 24*b*, an illuminated portion 28 of the identifier 16 may be illuminated. Accordingly, the illumination apparatus 10 may be configured to selectively illuminate one or more symbols or designs to reveal the identifier 16.

Figure 4A:
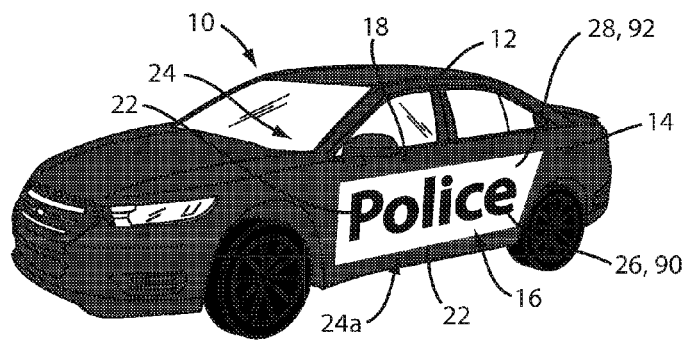
FIG. 4A is a front perspective view of an automotive vehicle comprising an illumination apparatus demonstrating a first configuration.
Figure 4B:
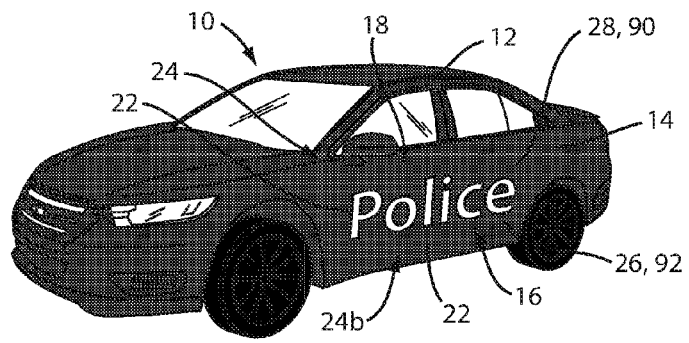
FIG. 4B is a front perspective view of an automotive vehicle comprising an illumination apparatus demonstrating a second configuration.
Figure 4C:
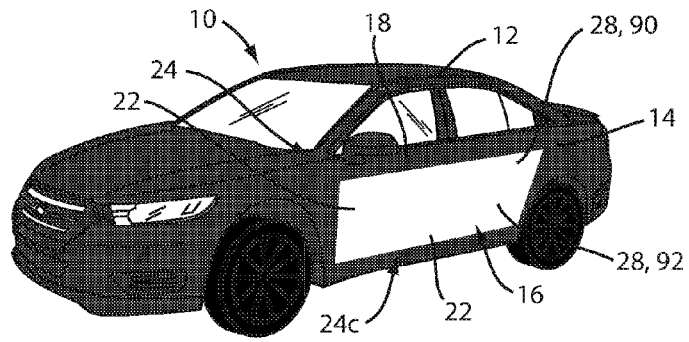
FIG. 4C is a front perspective view of an automotive vehicle comprising an illumination apparatus demonstrating a third configuration.

As demonstrated in FIGS. 4A-4C, the identifier 16 may be referred to as a first portion 90 corresponding to a first light producing assembly 22 of the illumination apparatus 10. The second portion 92 of the illumination apparatus 10 may be configured to illuminate the outline corresponding to the negative or inverse of one or more symbols or designs of the identifier 16. Referring to FIG. 4C, in a third configuration 24*c*, the controller of the illumination apparatus 10 may be configured to activate both the first portion 90 and the second portion 92. In this configuration, the illumination apparatus 10 may illuminate each of the light emitting assemblies 22 in one or more colors or light. If a first output emission 28*a* is of the same color as a second output emission 28*b*, the illumination apparatus 10 may illuminate the first portion 90 and the second portion 92 as a continuous portion. In such a configuration, the identifier 16 may be masked due to a consistent illumination of the each of the first portion 90 and the second portion 92.

Figure 4D:
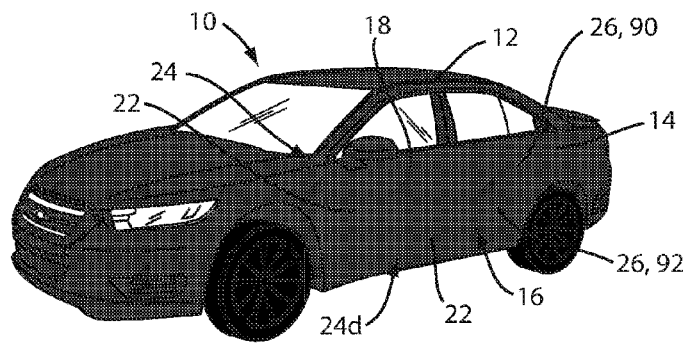
FIG. 4D is a front perspective view of an automotive vehicle comprising an illumination apparatus demonstrating a fourth configuration.

Referring now to FIG. 4D, in a fourth configuration 24*d*, the controller 102 may be configured to deactivate the first portion 90 and the second portion 92 of the illumination apparatus 10. In this configuration, the illumination apparatus 10 may be concealed from a view of an onlooker. The surface layer 86 may be configured to conceal the light producing assemblies 22 by providing a similar appearance to the exterior surface 14 of the panel 18 adjacent thereto. The surface layer may correspond to a film layer and/or an overmolded layer. The overmolded layer may correspond to an optical silicon configured to match a color of the exterior surface 14. In some embodiments, the emitting surface 88 may further comprise a textured or grained surface configured to provide for a surface reflectance of the surface layer 86 significantly matching a surface reflectance of the exterior surface 14.

Figure 5:
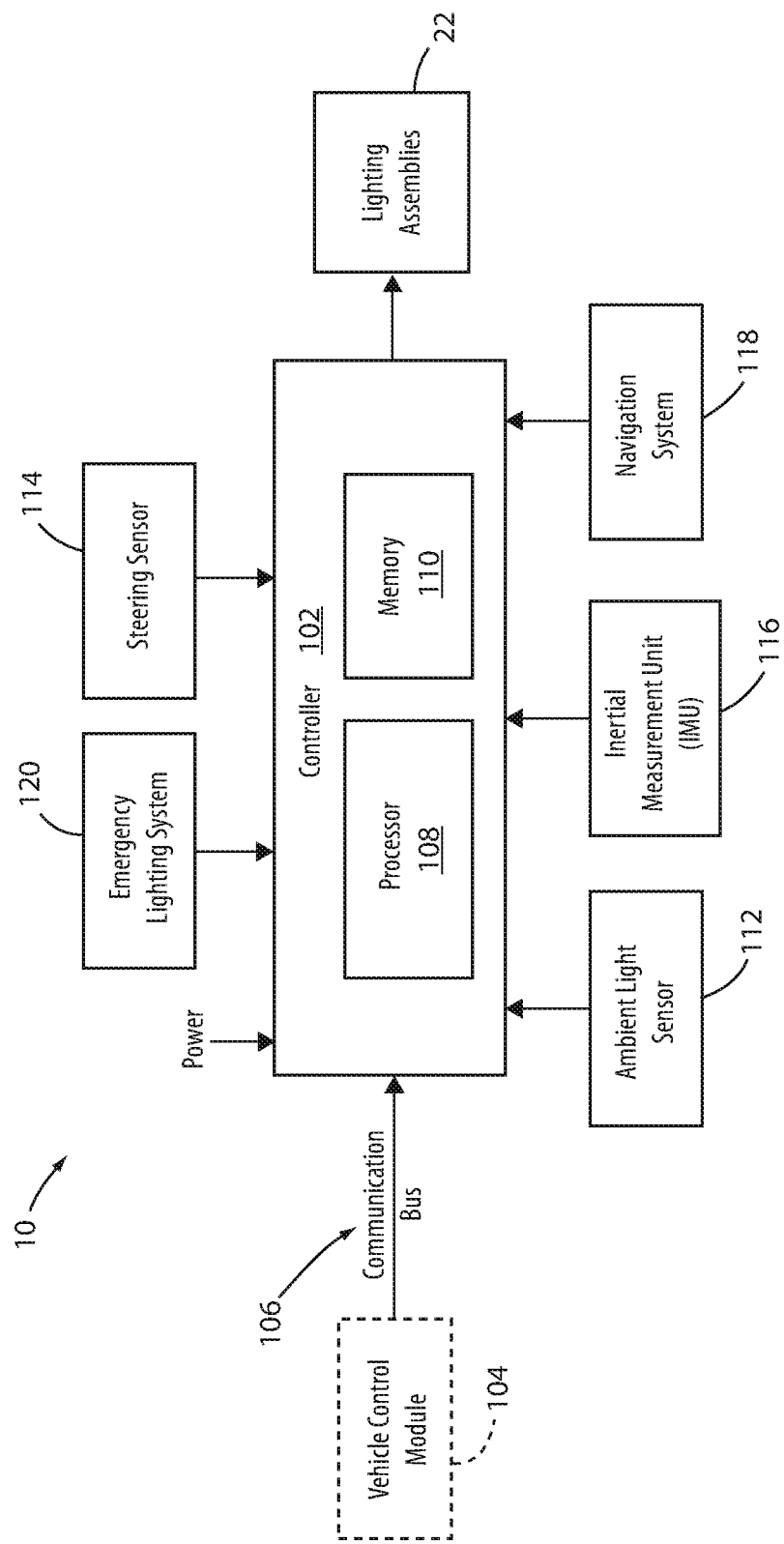
FIG. 5 is a block diagram of a lighting apparatus in accordance with the disclosure.

Referring to FIG. 5, a block diagram demonstrating the illumination apparatus 10 is shown. The controller 102 may be in communication with the light producing assemblies 22, via the bus bars 56 and 68 discussed herein. The controller 102 may be in communication with the vehicle control module 104 via a communication bus 106 of the vehicle 12. The communication bus 106 may be configured to deliver signals to the controller 102 identifying various vehicle states. For example, the communication bus 106 may be configured to communicate to the controller 102 a drive selection of the vehicle 12, an ignition state, a door open or ajar status, a lighting state, a braking condition, vehicle velocity or speed, a remote activation of the illumination apparatus 10, or any other information or control signals that may be utilized to activate one or more of the light producing assemblies 22 of the illumination apparatus 10. Though the controller 102 is discussed herein, in some embodiments, at least a portion of the illumination apparatus 10 may be activated in response to an electrical or electro-mechanical switch of the vehicle 12.

The controller 102 may comprise a processor 108 comprising one or more circuits configured to receive the signals from the communication bus 106 and output signals to control the illumination apparatus 10 to control the various output lights, emissions, indications, etc. as discussed herein. The processor 108 may be in communication with a memory 110 configured to store instructions to control the activation of the illumination apparatus 10. The controller 102 may further be in communication with an ambient light sensor 112. The ambient light sensor 112 may be operable to communicate a light condition, for example a level brightness or intensity of the ambient light proximate the vehicle 12. In response to the level of the ambient light, the controller 102 may be configured to adjust a light intensity of the output emission 24 from each of the light producing assemblies 22, layers, emitters, and/or light source discussed herein. The intensity of the light output from the illumination apparatus 10 may be adjusted by the controller 102 by controlling a duty cycle, current, or voltage supplied to the illumination apparatus 10.

The controller 102 may be in communication with one or more vehicle sensors that may be utilized to control one or more activation sequences or a timing of an activation of each of the light producing assemblies 22 discussed herein. For example, the controller 102 may be in communication with a steering sensor 114, an inertial measurement unit (IMU) 116, a navigation system 118, etc. Additionally, the controller 102 may be in communication with an emergency lighting system 120. The emergency lighting system 120 may correspond to at least one user interface configured to selectively activate one or more emergency lights, sirens, or other devices that may be used on an emergency vehicle, first responder, or law enforcement vehicle. Accordingly, the illumination apparatus 10 may be incorporated with one or more alert systems or devices.

The steering sensor 114 may correspond to a steering angle detection apparatus, which may be incorporated as a module of a power steering system of the vehicle 12. The steering angle may be detected by the steering sensor 114 via various sensory devices, for example a potentiometer, angular encoder, and various forms of sensors that may be in communication with the controller 102. Accordingly, the controller 102 may be configured to activate a sequence of an illumination of each of the light producing assemblies 22 in response to a steering angle of the vehicle 12.

The IMU 116 may correspond to one or more accelerometers, gyroscopes, and various other forms of sensors operable to detect motion or navigational data of the vehicle 12. Such devices may be configured to a detect directions and magnitudes of forces acting on the vehicle 12. Accordingly, the controller 102 may be configured to activate each of the light producing assemblies 22 based on a detected motion of the vehicle 12 identified by the IMU 116 of the vehicle 12.

The navigation system 118 may correspond to a globally positioning system (GPS) based navigational device configured to identify a heading and/or location of the vehicle 12. Additionally, the navigation system 118 may be configured to identify one or more pending navigational directions (e.g. future turns) of the vehicle 12. The navigation system 118 may communicate such navigation data to the controller 102 such that the controller 102 may selectively activate one or more control algorithms or lighting sequences of the light producing assemblies 22.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle illumination apparatus comprising:
   an emitting layer comprising a plurality of printed light sources and configured to conform to an outer surface of a panel of a vehicle;
   a reflective layer disposed on an interior surface of the emitting layer;
   a surface layer configured to seal an outer surface of the apparatus and match an appearance of the panel to conceal the apparatus; and
   a controller configured to selectively activate the light sources to reveal a symbol defined by the emitting layer for an emergency.

2. The vehicle illumination apparatus according to claim 1, wherein the emitting layer further comprises a plurality of electrodes and the printed light sources are printed between the electrodes.

3. The vehicle illumination apparatus according to claim 2, wherein the light sources printed between the electrodes correspond to light emitting diodes printed in a semiconductor ink.

4. The vehicle illumination apparatus according to claim 3, wherein the light emitting diodes are configured to generate a first emission of light in the ultraviolet range.

5. The vehicle illumination apparatus according to claim 4, wherein the reflective layer is configured to reflect at least a portion of the first emission outward toward an exterior surface of the emitting layer.

6. The vehicle illumination apparatus according to claim 1, further comprising a photoluminescent layer configured to convert the first emission to a second emission.

7. The vehicle illumination apparatus according to claim 6, wherein the photoluminescent layer corresponds to a painted layer comprising titanium dioxide.

8. The vehicle illumination apparatus according to claim 1, wherein the surface layer corresponds to an overmolded layer comprising a UV absorbing compound.

9. The vehicle illumination apparatus according to claim 1, wherein the surface layer is configured to prevent excitation of the photoluminescent layer due to environmental light impinging upon the surface layer.

10. A vehicle illumination apparatus comprising:
    an emitting layer comprising a plurality of printed light sources and configured to conform to an outer surface of a panel of a vehicle;
    a reflective layer disposed on an interior surface of the emitting layer;
    an overmold layer sealing the emitting layer and matching an appearance of the panel concealing the apparatus; and
    a controller configured to selectively activate the light sources revealing the emitting layer in an emergency.

11. The vehicle illumination apparatus according to claim 10, wherein the emitting layer further comprises a plurality of electrodes, wherein the printed light sources are printed between the electrodes.

12. The vehicle illumination apparatus according to claim 11, wherein the light sources printed between the electrodes correspond to light emitting diodes printed in a semiconductor ink.

13. The vehicle illumination apparatus according to claim 10, wherein the overmolded layer comprises a UV absorbing compound disbursed in a polymeric coating.

14. The vehicle illumination apparatus according to claim 10, wherein the overmolded layer is configured to prevent excitation of a photoluminescent layer of the emitting layer due to environmental light impinging upon the overmolded layer.

15. The vehicle illumination apparatus according to claim 10, wherein the overmolded layer comprises a pigment configured to match an appearance of the overmolded layer with a color of the panel.

16. The vehicle illumination apparatus according to claim 10, wherein an exterior surface of the overmolded layer forms a granular surface configured to match the appearance of the panel.

17. The vehicle illumination apparatus according to claim 10, wherein the granular surface is formed by laser etching.

18. A light emitting layer for a vehicle comprising:
    a reflective layer forming an interior surface configured to conform to an outer surface of the vehicle;
    a plurality of printed light sources substantially coating the reflective layer for illuminating an emergency; and
    an etched silicon layer overmolded on an exterior surface of the emitting layer and abutting a panel having a painted surface, wherein the silicon layer is configured to significantly match an appearance of the painted surface to conceal the light emitting layer.

19. The light emitting layer according to claim 18, wherein the reflective layer comprises titanium dioxide in at least one of a paint and an ink.

20. The light emitting layer according to claim 18, wherein the etched silicon layer comprises a UV absorbing compound disbursed in the etched silicon layer.

* * * * *